UNITED STATES PATENT OFFICE.

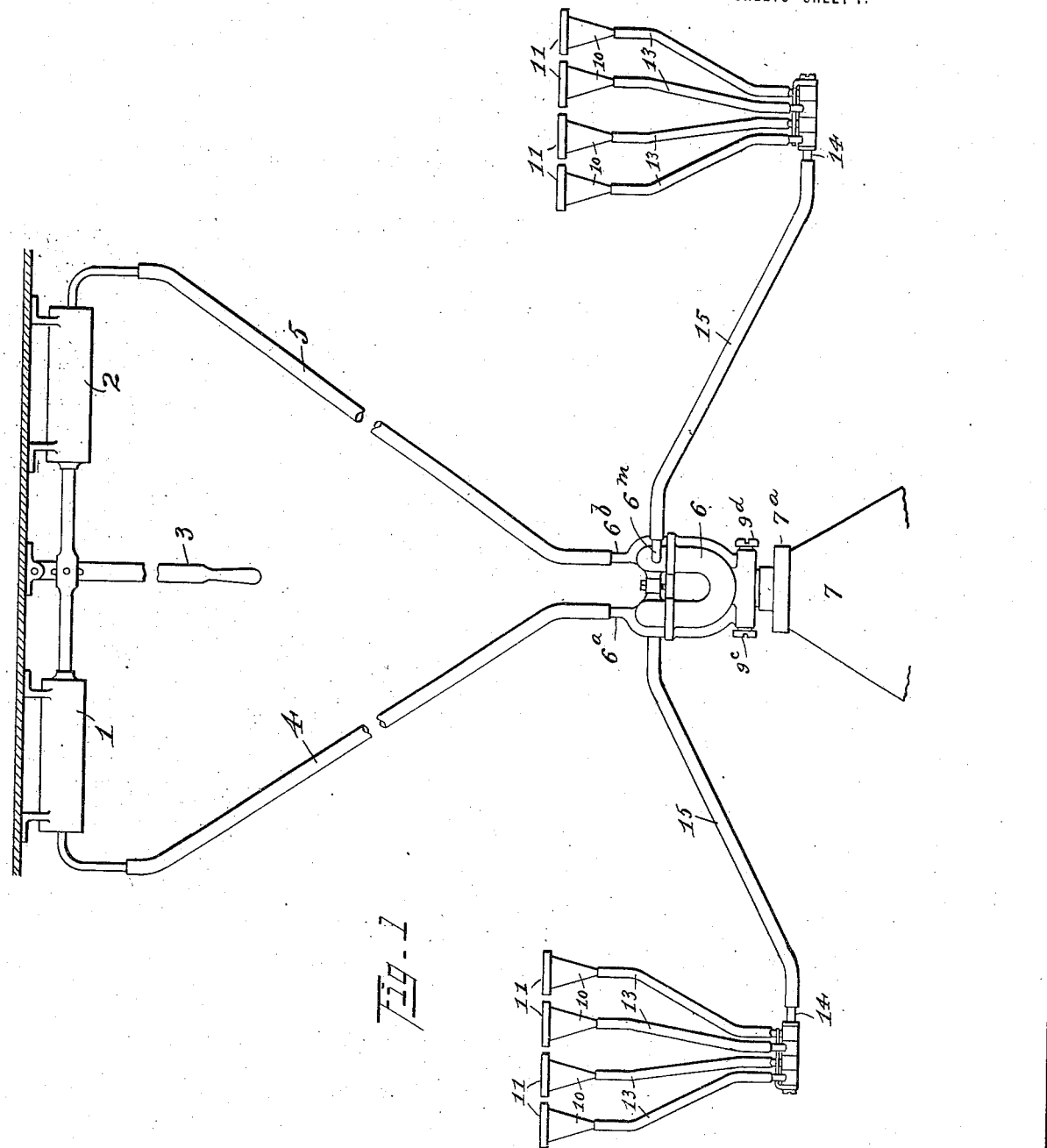

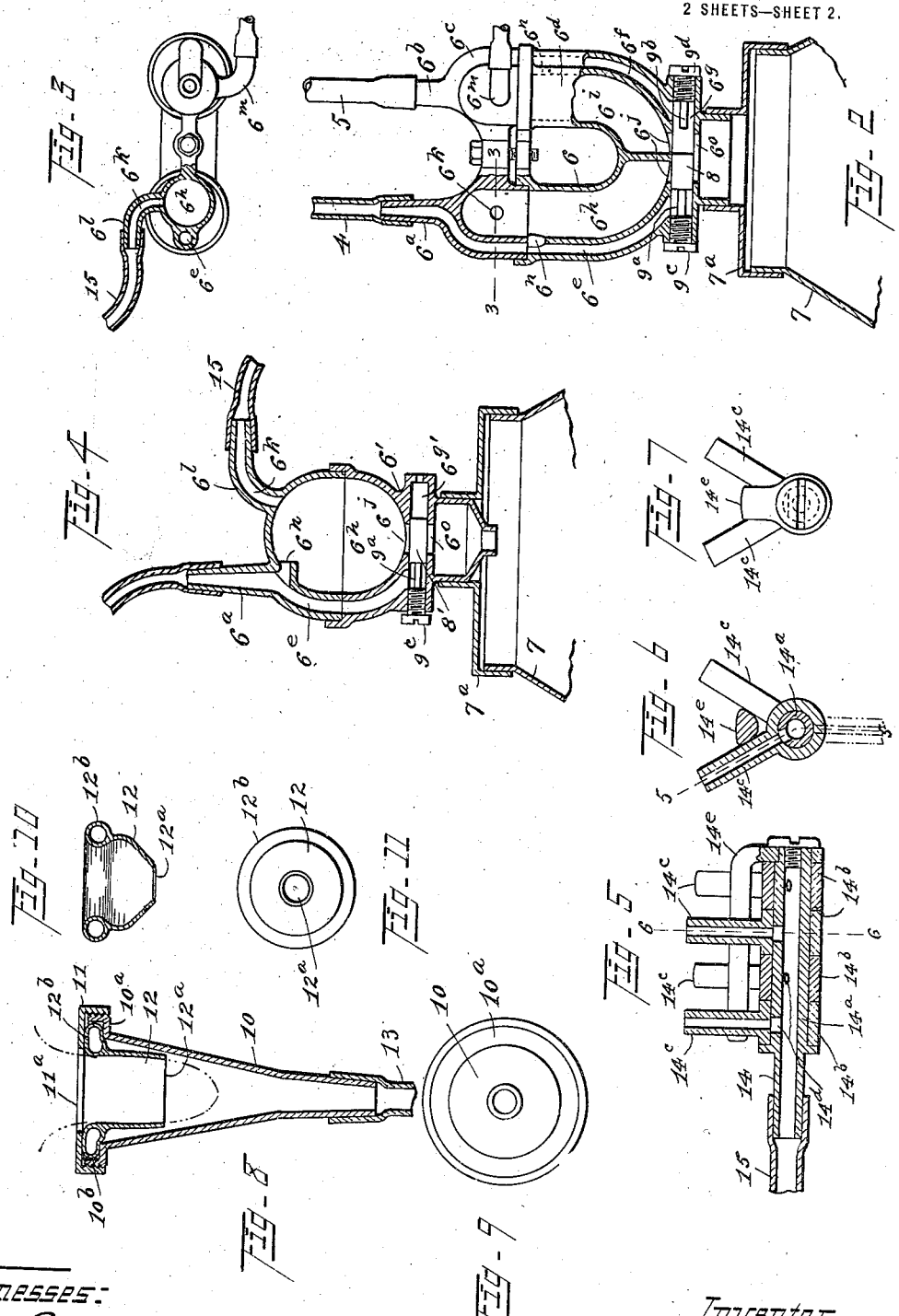

ALBERT VICTOR RACKSTRAW, OF BEDFORD, OHIO, ASSIGNOR, BY MESNE ASSIGNMENTS, TO THE MECHANICAL DEVELOPMENT COMPANY.

COW-MILKING MACHINE.

1,144,380.  Specification of Letters Patent.  Patented June 29, 1915.

Application filed July 9, 1914. Serial No. 849,877.

*To all whom it may concern:*

Be it known that I, ALBERT VICTOR RACKSTRAW, a subject of the King of Great Britain, residing at Bedford, in the county of Cuyahoga, State of Ohio, have invented certain new and useful Improvements in Cow-Milking Machines, of which the following is a specification.

This invention relates to improvements in cow-milking apparatuses, and it has for its objects the provision of mechanical means for cow-milking, that is simple in construction, that is easily kept in a sanitary condition, that is not injurious to the cow, and that is highly efficient in its operation.

More especially the invention resides in the provision of a cow-milking apparatus that is operated in connection with any simple type of single acting suction pump for milking one cow, or in connection with a duplex suction pump for two cow milking. In both cases the functions of the operative parts, and the mechanical principles are the same.

The invention further resides in the specific form of teat cup used, and still further in the manifold connection for the teat cups.

With these and other features in view the invention consists in the construction, arrangement, and combination of parts, an embodiment of which is illustrated in the accompanying drawings in which similar characters are employed to designate similar parts in the several views.

In the drawings Figure 1 illustrates an embodiment of the improved apparatus, adapted for milking two cows simultaneously. Fig. 2 is a view of the double milker construction, partially in central, vertical section, and detached from the pump connections and the teat connections. Fig. 3 is a plan view, partially in cross-section on line 3—3, Fig. 2. Fig. 4 is a central vertical section of the single milker. Fig. 5 is a sectional view of the manifold on line 5—5, Fig. 6. Fig. 6 is a section on line 6—6, Fig. 5. Fig. 7 is an end view of the manifold. Fig. 8 is a central, vertical section of one of the teat cups, and Fig. 9 is an underside view of same. Fig. 10 is a central, vertical section of the gland or teat retainers, in its contracted or normal condition, and Fig. 11 is an underside view of same.

In Fig. 1 the operative means for the improved milker is illustrated more or less diagrammatically, 1 and 2 representing two cylinders of a double acting suction pump, the pistons of which are actuated by the hand lever 3. Suitable connections 4 and 5 (preferably rubber hose) are made between the cylinders 1 and 2 and the nozzles $6^a$ and $6^b$ respectively, of the member 6. The member 6 comprises a casing, made preferably in two parts $6^c$ and $6^d$, for sanitary reasons and for convenience of manufacture. The nozzles $6^a$ and $6^b$ provide terminals for ports $6^e$ and $6^f$, which connect with a valve barrel $6^g$. Two chambers $6^h$ and $6^i$ also have open connection with the barrel $6^g$, as shown at $6^j$. Intake ports $6^k$, one of which is shown in Figs. 2 and 3, enter the chambers $6^h$ and $6^i$ through the stems $6^l$ and $6^m$. Openings $6^n$ connect the chambers $6^l$ and $6^m$ with the ports $6^e$ and $6^f$.

The member 6 is adapted to attachment to the cover $7^a$ of a suitable receptacle 7, the barrel $6^g$ being provided with an elongated opening $6^o$ communicating with the interior of said receptacle. The barrel $6^g$ contains a sliding valve member 8, and is provided with stops $9^a$ and $9^b$, which govern the distance of travel of the valve 8. The stops can be adjusted by screws $9^c$ and $9^d$.

It will readily be seen that suction created by the pump, and acting through the port $6^e$ will draw the valve 8 to the stop $9^a$, thereby closing the open connection between the chamber $6^h$ and the receptacle 7, and creating, through the opening $6^n$ a vacuum in said chamber $6^h$, and consequent suction through port $6^k$, resulting in drawing the milk from the cow into the chamber $6^h$, through the means hereinafter described.

While the suction action, above described, is taking place in connection with the chamber $6^h$, the chamber $6^i$ is receiving the benefit of the reverse, or exhaust action and discharging the milk that has been drawn into said chamber 6ⁱ, by the previous suction stroke, through the openings 6ʲ and 6ᵒ into the receptacle 7. This arrangement eliminates the back pressure on the teats, as the openings 6ʲ and 6ᵒ provide an outlet for the air that would otherwise be compressed, and cause a back pressure through the teat connections. This is an important feature, as it has been found that the back pressure is injurious to the cow.

The teat cups and their connections with the member 6 will now be described, particular attention being called to Figs. 5 to 11 inclusive. The member 10 is a conical, metal sleeve provided with an annular flange 10ᵃ and an externally threaded rim 10ᵇ. An internally threaded cap 11, having an opening 11ᵃ therein, is adapted to be threaded onto the rim 10ᵇ. The teat holder consists of a soft, flexible rubber thimble or gland 12, shaped substantially as shown in Fig. 10, contracted at its lower end around a small opening 12ᵃ, and provided with a bead 12ᵇ, which furnishes the means for retaining the gland in the teat cup, the bead being clamped between the flange 10ᵃ and the cap 11, as shown in Fig. 8. The elasticity of the rubber admits of the expansion of the opening 12ᵃ, thereby making the gland automatically adjustable to any size of teat, and causing it to fit snugly to the teat, making an air tight connection therewith.

The teat cups are connected by means of rubber hose 13, with a manifold member 14. The manifold member comprises a tubular core 14ᵃ. Circumscribing the core 14ᵃ is a series of collars 14ᵇ, corresponding in number to the number of teat cups used, these collars are provided with tubular stems 14ᶜ which are adapted to register with ports 14ᵈ in the core 14ᵃ, when the device is in operative position. The hose 13 is connected with the stems 14ᶜ. The ports 14ᵈ are preferably staggered, and the collars 14ᵇ have a ground fit on the core 14ᵃ. A dividing or stop bar 14ᵉ is provided as a means for insuring the registration of the stem openings with the staggered ports 14ᵈ when in operative position.

When it is desired to put any one or more of the teat connections out of commission, as for example in milking a three teat cow, the collar 14ᵇ, of the connection elected to be disconnected, is turned on the core 14ᵃ, to the position shown by broken lines in Fig. 6, this closes the port 14ᵈ and shuts off the suction.

Hose connection 15 is provided from the manifolds 14 to the stems 6ˡ and 6ᵐ of the member 6, thereby providing open communication from the teat cups to the chambers 6ʰ and 6ⁱ of the member 6.

Referring to Fig. 4, which illustrates an embodiment of the single cow-milker, it will be seen that the elements employed and the functions which they perform are the equivalents of those of the double milker, the construction of the member 6′ being modified for adaptation to a single suction pump. The member 6ᵇ is eliminated and the members 6ᵍ′ and 8′ perform the same functions as the members 6ᵍ and 8.

The foregoing specification applies to the apparatus as illustrated in the accompanying drawings, but it is to be understood that I am not restricted to this specific construction, only so far as limited by the claims and the existing state of the art.

What I claim and desire to secure by Letters Patent is:—

1. In an apparatus for the purpose described, the combination of an air-pump; a milk receptacle; an operating member adapted to be connected with the milk receptacle; connecting means between said operating member and the air-pump, the operating member comprising a casing provided with a port opening into said connecting means, a chamber, a valve barrel, an opening from the port into the chamber, an opening from the port into the valve barrel, an opening from the chamber into the valve barrel, an opening from the valve barrel into the milk receptacle, and a valve in the barrel for closing and opening the openings in said barrel; a series of teat cups; and connections between said teat cups and the chamber in the operating member.

2. In an apparatus for the purpose described, the combination of a double acting air-pump; a milk receptacle; an operating member adapted to be connected with the milk receptacle; connecting means between said operating member and the two cylinders of the air-pump for creating alternate suction and compression in the operating member, said operating member comprising a casing provided with ports opening into said connecting means, two chambers, a valve barrel, openings from the ports into the chambers, openings from the ports into the valve barrel, openings from the chambers into the valve barrel, an opening from the valve barrel into the milk receptacle, and a valve in the barrel for closing and opening the openings in said barrel; a series of teat cups; and connections between said teat cups and the chambers in the operating member.

3. In apparatus for the purpose described, the combination of an air-pump; a milk receptacle; a suction member adapted to be connected with the milk receptacle; connecting means between said suction member and the air-pump; a series of teat cups; a manifold member; connecting means between said teat cups and the manifold member, said manifold member comprising a tubular core having a series of collars mounted thereon, said collars being provided with nipples, ports in the core arranged to register with the openings in the nipples, and the collars being revoluble on the core, whereby said ports may be closed; and connecting means between the manifold and the suction member.

ALBERT VICTOR RACKSTRAW.

Witnesses:
FRED C. SCHLATTER,
L. F. GRISWOLD.